(12) United States Patent
Kommula et al.

(10) Patent No.: US 12,490,170 B2
(45) Date of Patent: Dec. 2, 2025

(54) METHODS AND APPARATUS FOR NETWORK TRACING, FORECASTING, AND CAPACITY PLANNING

(71) Applicant: Selector Software, Inc., Santa Clara, CA (US)

(72) Inventors: Sunanda Kommula, Cupertino, CA (US); Nitin Kumar, Fremont, CA (US); Santosh Pallagatti Kotrabasappa, Bengaluru (IN)

(73) Assignee: SELECTOR SOFTWARE, INC., Santa Clara, CA (US)

( * ) Notice: Subject to any disclaimer, the term of this patent is extended or adjusted under 35 U.S.C. 154(b) by 118 days.

(21) Appl. No.: 18/600,223

(22) Filed: Mar. 8, 2024

(65) Prior Publication Data
US 2025/0287287 A1    Sep. 11, 2025

(51) Int. Cl.
*H04W 40/18* (2009.01)
*H04W 16/22* (2009.01)
*H04W 24/02* (2009.01)

(52) U.S. Cl.
CPC ........... *H04W 40/18* (2013.01); *H04W 16/22* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 7,496,650 B1 | 2/2009 | Previdi | |
| 10,735,270 B1 * | 8/2020 | Whipple | G06F 11/3409 |
| 11,323,357 B1 | 5/2022 | Mahadevan | |
| 11,354,268 B2 | 6/2022 | Jones | |
| 12,388,714 B2 * | 8/2025 | Kommula | H04L 43/067 |
| 2004/0213198 A1 | 10/2004 | Mahmood | |
| 2005/0018602 A1 | 1/2005 | Labovitz | |
| 2014/0313937 A1 | 10/2014 | Roper | |
| 2015/0200838 A1 | 7/2015 | Nadeau | |
| 2015/0215206 A1 | 7/2015 | Solis | |
| 2015/0271034 A1 * | 9/2015 | Kanna | H04L 43/04 370/252 |
| 2016/0182365 A1 | 6/2016 | Chang | |
| 2019/0104057 A1 | 4/2019 | Goel | |
| 2019/0280962 A1 | 9/2019 | Michael | |
| 2020/0028762 A1 | 1/2020 | Sun | |
| 2020/0285547 A1 * | 9/2020 | Shukla | G06N 20/00 |
| 2020/0382399 A1 * | 12/2020 | Tewari | H04L 45/20 |
| 2021/0092023 A1 | 3/2021 | Sethi | |

(Continued)

FOREIGN PATENT DOCUMENTS

| | | |
|---|---|---|
| CN | 111541612 | 8/2020 |
| WO | 2004056047 A1 | 7/2004 |

OTHER PUBLICATIONS

International Search Report and Written Opinion of the International Searching Authority mailed Jan. 24, 2025, in International Application No. PCT/US2024/057528.

(Continued)

*Primary Examiner* — Brian S Roberts

(74) *Attorney, Agent, or Firm* — FisherBroyles LLP

(57) ABSTRACT

This disclosure pertains to computer-assisted methods, apparatus, and systems for forecasting network performance responsive to network reconfigurations in large scale communication networks.

19 Claims, 6 Drawing Sheets

(56) References Cited

U.S. PATENT DOCUMENTS

2021/0209059 A1\* 7/2021 Jones ................... G06F 13/20
2022/0094614 A1\* 3/2022 Khurshid .............. H04L 41/147
2023/0327952 A1 10/2023 Reehil, III

OTHER PUBLICATIONS

CN 111541612 A (Year: 2020).
Written Opinion of the International Searching Authority mailed May 5, 2025, in International Application No. PCT/US2025/017631.
International Search Report mailed May 5, 2025, in International Application No. PCT/US2025/017631.
U.S. Appl. No. 18/434,963, filed Feb. 7, 2024. (Available in Patent Center).

\* cited by examiner

- Name: Change link cost
  Router: E
  Peer: F
  Event: link-cost-update
  Cost: 1500

- Name: Graceful shutdown router
  Router: F
  Event: graceful-shutdown

- Name: Withdraw prefix
  Prefix: 8.8.8.0/24
  RouteReflector: RR1
  Event: withdraw-route

- Name: Inject prefix
  Prefix: 8.8.8.0/24
  RouteReflector: RR1
  Event: advertise-route
  Attributes: [nexthop, as-path, communities, origin, local-pref, med]

- Name: Delete edge router
  Router: K
  Event: withdraw-nexthop

FIG. 3

```
-Link-cost-update (Input: Router, Peer, Cost)
   -An IGP event to update link "Cost" from "Router" to "Peer"
-Graceful-shutdown (Input: Router)
   -Identify all connections of Router to all adjacent peers
   -For each adjacency, update the cost to max cost '65535'
-Withdraw-Prefix (Input: Prefix)
   -Route withdraw event
-Inject-prefix (Input: Prefix, RR, Attributes)
   -Advertise the prefix with the respective attributes
-Withdraw-nexthop (Input: Router)
   -Identify all the prefixes pointing to nexthop of "Router"
   -Route withdraw event for these prefixes
```

FIG. 4

METHODS AND APPARATUS FOR NETWORK TRACING, FORECASTING, AND CAPACITY PLANNING

FIELD OF THE INVENTION

This disclosure pertains to computer-assisted methods, apparatus, and systems for forecasting network performance responsive to network reconfigurations in large scale communication networks.

BACKGROUND

Communication networks provide data connectivity between any two nodes of the network. For instance, an Internet Service Provider (ISP) provides connectivity between its customers' computing devices, such as computers, cellular telephones, game consoles, wearable computing devices, etc., and the Internet. Many communication networks provide connectivity between two or more additional networks (and all the devices connected to those additional networks).

When one computing device on a network, e.g., Device A connected to network node A, wants to communicate with another computing device on the network, e.g., computing device B connected to network node B, there may not be direct connectivity between Node A and Node B. Rather, more likely, a communication originating at one node of the network intended for another node of the network is relayed through one or more other "relay" nodes of the network. For instance, Node A may not have direct connectivity with Node B, but does have direct connectivity with Node C, and Node C may have direct connectivity with Node D, and Node D may have direct connectivity with the destination Node B. Therefore, a message or communication from Node A may be routed through the network along a path from Node A to Node C to Node D to Node B. In fact, this relay paradigm is fundamental to the concept of mesh networks, such as the Internet.

Thus, when one of the nodes of a network is altered, it could have a significant impact on the efficient communication of messages, not only to and/or from that specific node, but between any two nodes of the network that might use that node as one of the nodes in the relay path between it and another node. In a large scale mesh network, such as the Internet, network nodes are constantly being added, removed, or modified. Some nodes may be removed from the network (e.g., temporarily, such as for repairs or upgrades, or permanently, e.g., a service provider goes out of business or determines that it does not need as many nodes as it has been previously supporting). Other potential alterations to network nodes include, adding nodes, changing the traffic capacities of nodes, altering the cost structure of the links of the nodes, altering the interface status of the nodes, etc. Even further, nodes may simply fail, either completely or partially and either permanently or temporarily. All such reconfigurations can have significant impact on the operation of the network, and particularly on the relaying of messages through the network.

Typically, networks are able to automatically adapt to such node alterations (e.g., reroute messages around a faulty or more expensive node).

In most networks, different messages, or even individual portions (e.g., packets) of each message, may travel between the same source device and destination device via different paths through the mesh network (different intermediate relay nodes).

A modern large scale network could easily comprise thousands, tens of thousands, hundreds of thousands, or more of nodes, and typically comprises a plurality of smaller, heterogeneous topologies. The Internet currently comprises over one million nodes, for example. And, of course, the Internet is connected to countless other networks, each potentially comprising tens of thousands of additional nodes, thus forming a massive heterogenous network of millions of nodes.

SUMMARY

In an embodiment, a computer-readable device comprises non-transitory instructions, which, when executed by a processor, cause the processor to perform the operations of: receiving information defining at least one proposed modification to a configuration of a communication network; receiving a query identifying a source device in the communication network and a destination device in the communication network; accessing a first snapshot of a state of the communication network at a first time, the first snapshot comprising a topology of the communication network and a Routing Information Base (RIB) of the communication network at the first time; accessing a set of network updates, the set of network updates comprising all updates to the topology and RIB of the communication network that occurred between the first time and a second time; generating, based on the first snapshot of the communication network and the set of updates, a second snapshot of the communication network, the second snapshot comprising a RIB and a topology of the communication network at the second time; generating, based on the generated RIB and a topology of the communication network at the time of the most recent accessed network update and the proposed at least one modification, a third snapshot of the communication network, the third snapshot comprising a RIB and a topology of the communication network as it would be if reconfigured in accordance with the proposed at least one modification; and determining, based on the RIB and topology of the third snapshot, at least one path through the communication network that a data packet intended for transmission from the source device to the destination device could traverse through the proposed modified communication network.

In another embodiment, a computer-readable device comprising non-transitory instructions, which, when executed by a processor, cause the processor to perform the operations of: receiving information defining at least one proposed modification to a current configuration of a communication network; receiving a query identifying a source device in the communication network, and a destination device in the communication network; accessing a first snapshot of a state of the communication network at a first time, the snapshot comprising a topology of the communication network and a Routing Information Base (RIB) of the communication network at the time preceding the time of interest; accessing a set of network updates, the set of network updates comprising all updates to the topology and RIB of the communication network that occurred between the first time and a current time; generating, based on the first snapshot of the communication network, the set of updates, and the proposed at least one modification, a second snapshot of the communication network, the second snapshot comprising a RIB and a topology of the communication network reconfigured in accordance with the proposed at least one modification; and determining, based on the RIB and topology of the second snapshot, at least one path through the communication network that a data packet intended for transmission from the source device to the destination device could traverse.

In another embodiment, a method of determining a path that a data packet would traverse through a communication network if at least one proposed modification were made to a configuration of the communication network comprises: receiving information defining at least one proposed modification to a configuration of a communication network; receiving a query identifying a source device in the communication network and a destination device in the communication network; accessing a first snapshot of a state of the communication network at a first time, the first snapshot comprising a topology of the communication network and a Routing Information Base (RIB) of the communication network at the first time; accessing a set of network updates, the set of network updates comprising all updates to the topology and RIB of the communication network that occurred between the first time and a second time; generating, based on the first snapshot of the communication network and the set of updates, a second snapshot of the communication network, the second snapshot comprising a RIB and a topology of the communication network at the second time; generating, based on the generated RIB and a topology of the communication network at the second time and the proposed at least one modification, a third snapshot of the communication network, the third snapshot comprising a RIB and a topology of the communication network as it would be if reconfigured in accordance with the proposed at least one modification; and determining, based on the RIB and topology of the third snapshot, at least one path through the communication network that a data packet intended for transmission from the source device to the destination device could traverse through the proposed modified communication network.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements.

FIG. 3 illustrates an exemplary playbook reflecting contemplated network reconfiguration events in accordance with embodiments;

FIG. 4 illustrates an exemplary conversion file corresponding to the playbook of FIG. 3 in accordance with embodiments;

DETAILED DESCRIPTION

Figure 1:
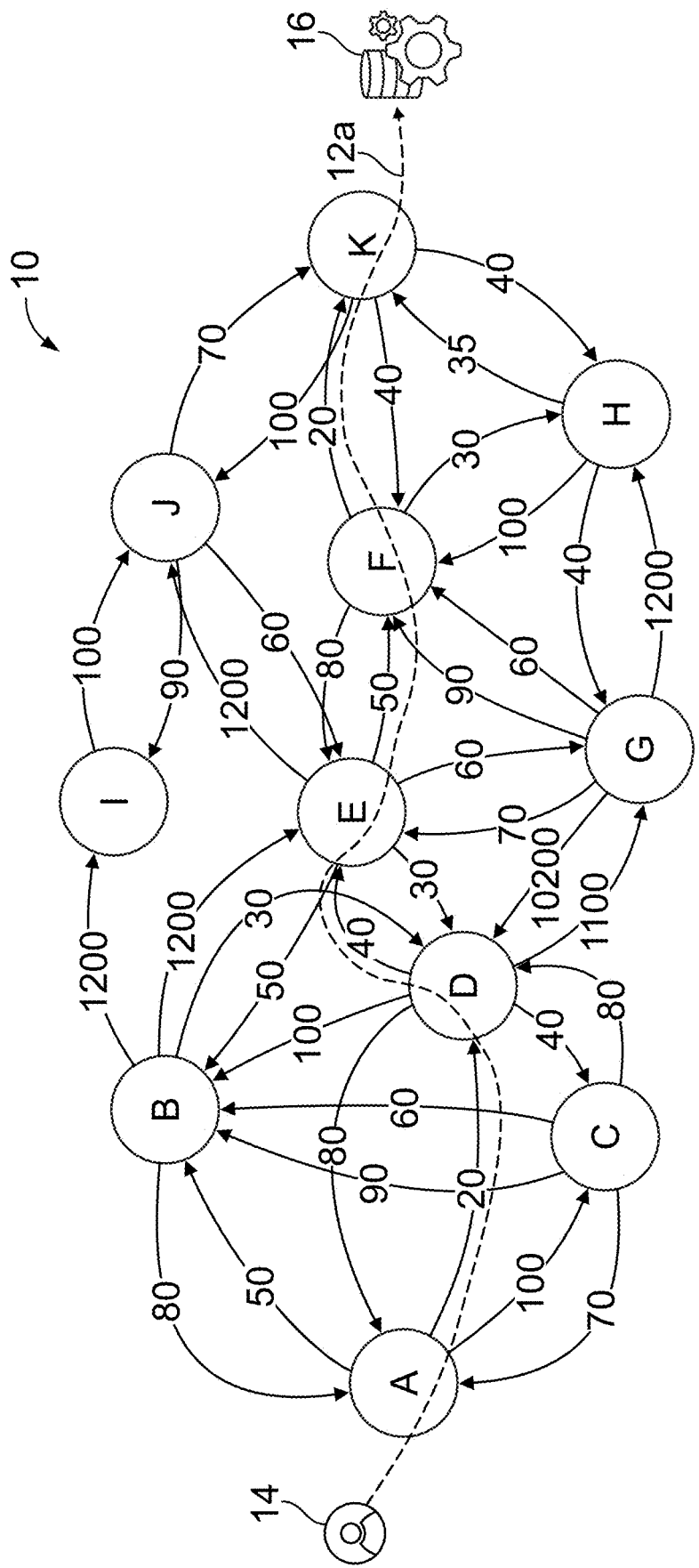
FIG. 1 is a diagram illustrating an exemplary network topology as well as packet routing through the network from a source device to a destination device connected to different nodes of the network.

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obfuscate the following description. Further, embodiments and examples not specifically described herein may be practiced in lieu of, or in combination with, the embodiments and other examples described, disclosed, or otherwise provided explicitly, implicitly, and/or inherently (collectively "provided") herein.

Effective network capacity planning is a critical task for large-scale service providers. This process involves, not only identifying the bandwidth and resources needed to support the network traffic that is expected, but also evaluating the potential consequences of future maintenance events within the network, such as temporarily disabling a node for software updates, hardware updates, or other purposes. Other exemplary maintenance events may include configuration changes, changes to the cost of network links, the graceful shutdown of routers, interface status changes, and more.

Thus, it would be beneficial for network operators to be able to proactively assess and predict the impact of network reconfigurations, such as those described above, prior to actually implementing such reconfigurations to be assured that the network will remain stable after such reconfiguration and to assure that changes occur in a predictable manner during scheduled maintenance windows.

For instance, network service providers should have confidence that maintenance events and the like will not result in unacceptable network performance, such as complete network isolation of one or more nodes/customers, and that customers have redundant paths for staying connected to their services, branch offices, and applications.

In accordance with certain embodiments, a computer-implemented method efficiently stores data from which a detailed model of the topology, status, and routing tables in the network at any given time can be created quickly, accurately, and efficiently, and then any contemplated change(s) to the network can be applied to that model to determine the effect the change will have on the performance of the network prior to actually implementing any such changes to the actual network.

In an embodiment, a network analyst or other user of the system can apply any contemplated reconfiguration(s) to the network model and then enter the network addresses (e.g., IP (Internet Protocol) addresses) of a source node (or even a particular device coupled to the network through a network node) and a destination node (or even a particular device coupled to the network through a network node) into the system, and the system will generate a report of the route(s) that a data packet can take through the network between those two nodes. Further, the system allows quickly linking from a first user interface showing the aforementioned route information to other user interfaces with various widgets showing detailed data about each node in the route, including, for instance: network status of upstream and downstream interfaces along the path; syslogs, events and alarms from devices along the path; IGP updates from the path elements and the entire network; and prefix updates for the matching route prefix.

As previously noted, when two computing devices exchange data over a network, the data is usually transported in discrete packets, wherein each packet travels along a path from the source node to the destination node via one or more intermediate nodes (hereinafter relay nodes). In a mesh network, a routing table is developed over a period of time that dictates how any given packet will be routed through the network from any given source node to any given destination node. More particularly, the nodes of the network exchange control plane messages (layer 1, 2, and/or 3 messages, such as prefix advertisement and discovery messages, etc.) whereby, over time, the nodes determine the complete topology of the network, including, for instance, which nodes are directly coupled to which other nodes and the cost of each connection between adjacent nodes. Some well-known protocols for advertisement and discovery of network topology data are OSPF (Open Shortest Path First) protocol, ISIS (Intermediate System to Intermediate System) protocol, and BGP (Border Gateway Protocol). The vast majority of current networks use one or more of these three protocols. Typically, each node first exchanges messages to determine to which other nodes it is directly coupled to (i.e., via one hop). Then, the various nodes of the network exchange that information with additional nodes until every node in the network has a complete picture of the topology of the network. As new nodes are added or old nodes are removed from the network, update messages are exchanged so that all of the nodes can continuously update their picture of the network topology and their respective routing tables.

FIG. 1 is a graphical representation of an exemplary network topology 10. It shows every node in the network as well as the links between the nodes and the cost of each link. In this simple example, there are 11 nodes, namely, nodes A through K. Each arrowed line represents a direct communication link between two nodes (i.e., two nodes that can communicate directly with one another without using an intermediate node, sometimes referred to as adjacent nodes). The arrows indicate the directions of the links, and the number in the middle of each line represents the relative cost of each link.

Once the network topology is mapped and known by all the node, each node can build a routing information base (often referred to by the acronym RIB or simply referred to as a routing table) which dictates to which other network node the node should transmit a data packet that is either generated at the node (e.g., at one of the devices coupled to the node) or received from another node for relay to yet another node. Particularly, each data packet typically includes within the packet the identity of the destination node and/or device for the packet. The node determines the next hop for the packet (i.e., the next node to which it should transmit the packet) based on the RIB and the destination node. The RIB is largely based on the network topology (including the interconnectivity of the network nodes and the cost associated with each hop).

Various algorithms are known for building routing tables. One such algorithm is Dijkstra's Shortest-Path-First algorithm, for instance. This particular algorithm attempts to determine the best route through the network from a given source node to a given destination node based primarily on a combination of the shortest path (e.g., the fewest hops) from the source to the destination and the lowest cost.

In some cases, the exact route that a packet takes through the network may also depend upon the content of the packet or the particular hardware of a node. For instance, video data may be sent along a different path than a short message or higher priority data may travel along a different path than lower priority data. Thus, in some cases, the RIB may identify more than one potential path that the data may take through the network and the ultimate path will be determined based on additional information external of the RIB (e.g., the type of the data or the hardware configuration of the relevant router).

Referring again to the network topology diagram of FIG. 1, it also demonstrates a route, represented by the dashed line 12a, dictated by the RIB for data originating at a source device 14 (e.g., a cellular telephone) that connects to the network through network node A and a destination device 16 (e.g., a server) that is connected to the network through network node K. As can be seen, using an algorithm such as the aforementioned Dijkstra's algorithm, the RIB dictates a path that goes from node A to node D, then from node D to node E, then from node E to node F, and, finally, from node F to node K.

In a common exemplary scenario, a user of the network may attempt to send data (an email, a voice telephone call, a text message, a video, an html request message, an html response message, a photograph, a word processing document, etc.) from a device (e.g., a home computer) that is coupled to one node of the network (hereinafter the source node) through the network (e.g., the Internet) to a server device coupled to another node of the network (hereinafter the destination node).

If one of the relay nodes, i.e., one of nodes D, E, or F, is reconfigured (e.g., is disabled for maintenance) or the cost of one or more of the links is altered, it may affect the path 12a that the data packet will take between source node A and destination node K. In fact, it could make it impossible for the network to relay the packet between node A and node K if no other path is available. Thus, before a node is disabled (or otherwise reconfigured) or a link cost is altered, it would be beneficial to determine how such a change in the network topology will affect the path that a data packet would take through the network from Node A to Node K, and particularly, if it will make it impossible to relay a packet between the two nodes (or make the cost prohibitive).

As will be described in more detail below, the report of how a contemplated network reconfiguration will affect the route between two nodes can be generated in a matter of seconds due to a memory-efficient manner in which network state data is stored and computed and the computationally efficient way that the model of the state of the network at any given moment is re-created from that data, and then any contemplated changes are applied to that model. In addition, a network analyst can quickly and efficiently drill down into specific details of each node in the route(s).

More particularly, in embodiments, the system leverages the technology disclosed in U.S. patent application Ser. No. 18/434,963, filed Feb. 7, 2024 and entitled Methods and Apparatus for Tracing Network Connectivity Failures in Communication Networks, which is incorporated herein by reference in its entirety, to build a model of the network at any given time and then apply any contemplated changes to that model to create a new model of the network with the contemplated changes implemented. A network analyst can then query that new model to determine the path that a data packet would take through the network between any two network nodes if such changes were made to the network before actually implementing the change. The system also allows the analyst to drill down and view detailed information about each node along that path, thereby enabling the analyst to possibly determine additional changes that might be implemented to alleviate any problem created by the originally contemplated change.

In operation, the system obtains at least one BGP file disclosing the state of the network at a certain instance in time (hereinafter sometimes referred to as a snapshot). Such BGP files are well known in the related arts and comprise data that can be used to determine the topology of the network as well as the routing tables for the network at a given instant in time. In an embodiment, the system may obtain such BGP files at various intervals selected to assure that a relatively recent snapshot of the network is always available at any given moment. In an embodiment, when a new, more recent BGP file is obtained, the previous BGP file may be discarded. However, in other embodiments, and particularly in situations where the network operator may be interested in determining how certain reconfigurations would have affected the network at times in the past, the system may continue to store older snapshots of the network for such purposes.

The interval between the snapshots may be fixed or may be variable. The intervals may be determined as a function of network operational parameters, such as traffic volume, number of nodes in the network, etc.

A BGP file for a large scale network, such as that of a large commercial ISP could easily exceed 100 Gigabytes of data. Accordingly, a balance must be struck between the intervals, the period of time over which the system will maintain such files before deletion, and the memory needed to store those snapshots.

In one exemplary practical embodiment, the system obtains from the network operator a BGP file of the state of the network at intervals of 12 hours. The period of time over which the network status BGP files are stored before being deleted can be any period.

From each BGP file, the system builds a snapshot of the state of the network at that instant. Each snapshot comprises the RIB for the entire network and the IGP topology of the network at that instant in time.

In addition, the system obtains and stores records of the updates to the routing and other protocols, such as OSPF, ISIS, and BGP, at smaller intervals between the BGP file snapshots. Again, these intervals can be of any duration, can be fixed or variable, and/or can be a function of network conditions. For purposes of example, in one embodiment, the interval between obtaining such reports may be fixed and may be every ten minutes.

Unlike the BGP files from which the snapshots of the network state are built, these update files do not comprise information as to the state of the network at any given instant in time, but rather comprise a list of events that occurred in the network (those events that can affect the topology and/or routing tables in the network, such as OSPF, ISIS, and BGP updates). These update reports also are well known in the related arts.

Figure 2:
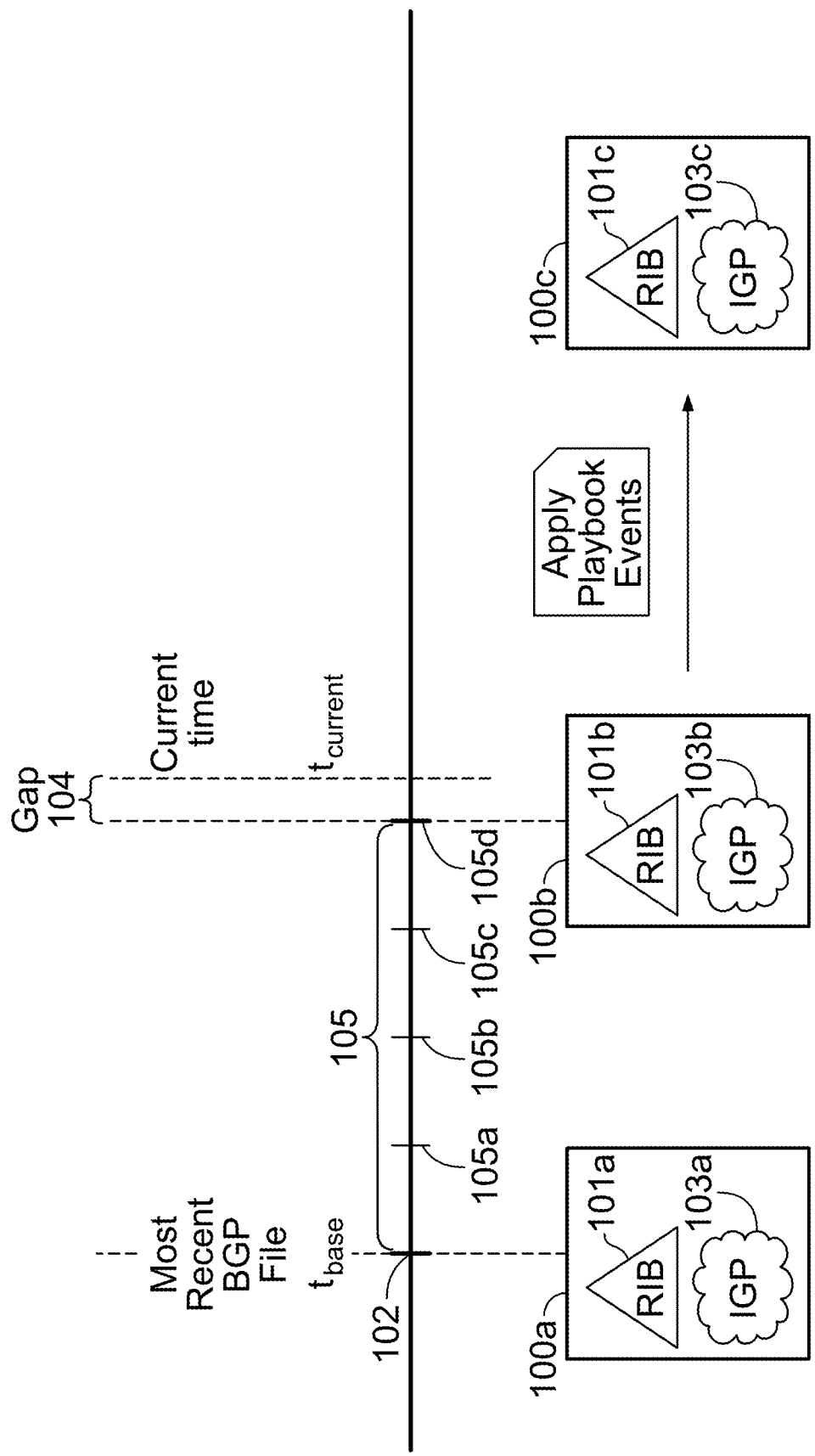
FIG. 2 is a timing diagram graphically illustrating aspects of building snapshots of the state of a network in accordance with embodiments.

FIG. 2 is a timing diagram graphically illustrating various aspects of how the system builds models of a network with contemplated network reconfigurations implemented therein in accordance with embodiments.

In this example embodiment, the system obtains a stores a BGP file from the network operator that provide a snapshot of the state of the network at twelve hour intervals. FIG. 2 shows the most recently obtained BGP file at 102. The data in each BGP file may be considered to comprise two basic forms of data from which a model (Sometimes referred to herein as a snapshot) 100*a* of the state of the network can be constructed. The first is the network RIB at that instant in time represented by the triangular icons 101*a*. The second is the IGP profile, which is a picture of the topology of the network at that instant in time, represented by the cloud icon 103*a*.

In addition, at multiple intervals between receiving each BGP file 102, the system obtains a record 105 of all of the routing protocol updates that occurred between the current update and the immediately preceding update (or the BGP file 102 in the case of the first update file after receiving a BGP file). In order to keep FIG. 2 from becoming too busy, the updates are represented by vertical lines 105, and only some of those updates are labelled with the reference number (105). Furthermore, only seven updates are shown between each snapshot (which would translate into an update about every 103 minutes). However, as noted above, in a preferred embodiment, the intervals would likely be much smaller, perhaps on the order of about every 10 to 20 minutes. As will become clear from the discussion below, the smaller the intervals between update reports 105, the shorter the time lapse between the most recent snapshot of the network that the system can create and the current time (and thus the more accurately the model of the network that the system builds represents the actual current state of the network). Particularly, the system obviously cannot be assured that it is building a completely accurate snapshot of the state of the network at any instant in time that is subsequent to the last received update report 105 (or the last snapshot 100, if no update report 105 has been received since the last snapshot) since additional updates could have occurred between the most recent update report 105 and the current time.

In an embodiment, the system provides a language and interface that allows a network analyst to input data defining any contemplated changes to the network that he/she wishes to test out before implementing the changes in the actual network. It also provides a language and interface for the analyst to input a query specifying a source node (or device) and destination node (or device) between which the system is to determine the path that a data packet would take through the network if reconfigured in accordance with the contemplated network reconfigurations).

In operation, a network analyst may input data defining any contemplated changes to the network that he/she wishes to evaluate before implementing them in the actual network. The analyst may also input a query identifying a source node and a destination node for which he/she wishes to determine the path parameters through the network should the network be reconfigured with the contemplated changes. The system then builds a model/snapshot of the network at the current time (or as close to the current time as possible as discussed in the preceding paragraphs, but hereinafter referred to simple as the "current time" for ease of reference) by taking the most recent snapshot 100*a* of the network and applying to that snapshot all updates found in all of the update files 105 received since that snapshot as well as all of the contemplated changes entered by the analyst. As shown in FIG. 2, each model includes a RIB 101 and a network topology 103. Using that RIB and topology, the system generates a report showing how a data packet transmitted between the source and destination nodes input by the analyst would traverse the network, and allows the analyst to drill down into extremely detailed information (discussed in more detail below) about each node in the path between (and including) the source node and the destination node.

More particularly, in order to build the model of the network reconfigured in accordance with the analyst's contemplated changes, the system first retrieves the most recent snapshot BGP file 102 as a base starting point (herein referred to as the base snapshot or base model). It also retrieves all updates 105 available since that most recent snapshot and applies all of those updates to build a second model/snapshot of the state of the network at the current time. Finally, the system takes the contemplated future updates input by the analyst and adds them to the current model to build a third and final model including the contemplated network changes (herein referred to as the test model).

The system will then take the data input by the analyst as to the source and destination nodes of interest and generate a report of the path that a packet would travel between the source and destination nodes if the contemplated network changes were implemented. The system also provides user interfaces that allow the network analyst to easily drill down into detailed information about each node in those paths.

Referring again to FIG. 2, it demonstrates various aspects of the above-described model-building portion of the operation. As can be seen, in this example, the current time, $t_{current}$, is approximately 6 AM on July 1. In order to determine the state of the network at time $t_{current}$, the system retrieves the most recent available BGP file 102 preceding the current time, which was at time $t_{base}$, which was approximately 12 AM on July 1. It then builds a base snapshot or model 100a of the network at time $t_{base}$, including a RIB 101a and an interconnected topology 103a by combining any OSPF, ISIS, and BGP data for the snapshot time.

The system also retrieves all of the update reports 105 since time $t_{base}$, which, in this example, includes update reports 105a, 105b, 105c, and 105d. Specifically, as previously mentioned, each update report 105 includes all of the network updates that occurred since the last update report (or BGP file). They are not snapshots, but rather lists of the changes that occurred in the network and the times that they occurred. Also as previously mentioned, there may be a small time gap 104 between the time of the last update report 105d and actual the current time, $t_{current}$. Hence, let us call the time corresponding to the last update report 105d time $t_{current\text{-}gap}$ or $t_{c\text{-}g}$.

Then, it applies all the updates found in the update reports 105a, 105b, 105c, 105d that occurred between the snapshot 100a at time $t_{base}$ and time $t_{c\text{-}g}$, and builds a new snapshot/model 100b at time $t_{c\text{-}g}$ comprising a new RIB 101b and a new IGP topology 103b. The new RIB 101b for time $t_{c\text{-}g}$ is built by dynamically applying all prefix advertisements and withdrawals found in the update files 105a, 105b, 105c, and 105d to the RIB 101a. The new topology 103b is built by dynamically applying all of the IGP updates contained in the update reports 105a, 105b, 105c, and 105d to the IGP topology 103a of snapshot 100a. This snapshot/model a time $t_{c\text{-}g}$ reflects the state of the network as close to the current time, $t_c$, as reasonably possible.

Next, the system reads the contemplated changes entered by the analyst, converts them into updates in accordance with the update protocol of the network, and applies those contemplated updates to the RIB 101b and IGP topology 103b of snapshot/model 100b to build the test snapshot/model 100c of the network, including a new RIB 101c and a new topology 103c. More particularly, the system applies contemplated RIB events entered by the analyst to form the new RIB 101c. Then the system implements a route lookup to find the destination egress-nexthop for the specified destination node, e.g., using longest-prefix match on the new test RIB 101c. Next, the system applies the contemplated maintenance events on top of the topology 103b to generate a new IGP topology 103c. Finally, the system uses the RIB 101c to determine the path that a data packet would traverse through the network from the source node to the destination node under the contemplated network configuration, e.g., by applying Dijkstra's shortest-path-first algorithm to determine the shortest path from the source device/node to the egress-nexthop.

The system now has a complete model of the network as it would exist if the contemplated changes were implemented. In embodiments, the system will automatically generate a report showing the path that a data packet would traverse from the source node to the destination node entered in the analyst's input query. It also allows the analyst to drill down using simple user interfaces (described in more detail below) to extremely detailed data about each node in the path.

In some embodiments, the system may be configured to also determine and show the "before" path, i.e., the path before the contemplated changes are implemented (which would be a path built using the model 100b at time $t_{c\text{-}g}$) so that the analyst can directly see and compare the current network performance and the network performance with the contemplated changes, i.e., a "before" and "after" (or "without changes" and "with changes") analysis.

Also, with the snapshot/model 100c now prepared, the analyst can enter any new queries specifying different source and/or destination nodes to cause the system to generate path reports for such new source-destination scenarios (and the commensurate drill-down information) extremely quickly (since the test model needed to generate such reports is already built).

As previously noted, sometimes, the generated network topology and routing table may reveal that more than one potential path was possible at a given instant between a particular source node and a particular destination node. If the RIB indicates that more than one potential path is available via different peers, the system may return results disclosing all possible paths. In certain embodiments, the system may use BGP best path selection algorithm to determine the best path and present the best path in the report along with the alternate paths, the tie-breaker factor between the potential paths, and BGP attributes.

In certain embodiments, in addition to the forward path, the system may also indicate asymmetry in the network (i.e., if the reverse path from destination to source is not exactly a mirror of the forward path) and include information about the reverse path(s) in the report.

The order of most of the steps described above is exemplary and may be altered as desired to suit the network operator. For instance, in some embodiments, the system may build a base model every time a new BGP file 102 is received so as to have it already available whenever a user enters a query (rather than waiting for a user to enter a query before building the base model). This would reduce the time between entering a query and generating the results. On the other hand, if the system is not used very frequently, it may be a waste to computing power to generate base models for every BGP report if the system is not often used between BGP file times. As another example, the user may enter the source-destination query before entering the contemplated network reconfigurations.

Also, in some embodiments (particularly those embodiments in which it is not desired to see the "before" path), it may not be necessary or desirable to separately build a current model from the base model and then build a test model from the current model. Rather, the system could combine the updates from the update reports and the updates corresponding to the contemplated network changes and build the test model directly from the base model by applying all of those updates in order in one single process without generating the intermediate current model.

The system described herein is efficient in that the use of snapshots at well-spaced intervals combined with update reports at smaller intervals between the snapshots minimizes the amount of memory needed to store the massive amount of data needed to build the current time models.

Furthermore, storing the update files 105 at relatively small intervals allows the building of the current network models that are extremely close to being up to date.

In certain embodiments, the updates 105 may be obtained at variable intervals. Additionally or alternately, the updates 105 may be obtained upon demand, thus allowing reporting of network status virtually up to the second with virtually no gap period during which data is not yet available. In fact, in some embodiments, in order to reduce storage memory requirements and well as provide the building of virtually contemporaneous current network models, the update data 105 may not be obtained or stored at all except in response to the system receiving an actual query from a network analyst, in which case the update report may comprise a single update report including all updates since the last BGP file, rather than multiple such reports.

As previously noted, in some embodiments, it may be desirable to allow a user to create, not only future test scenarios, but also test contemplated network reconfigurations at any reasonable time in the past. In such embodiments, the system may be modified to obtain and/or store, not only the most recent network snapshot BGP file 100 and the update files 105 since that most recent snapshot file, but also retain/store previous BGP snapshot files 102 going back as far in time as desired as well as all update files between those snapshots. The system could then recreate the state of the network at any desired time in the past by retrieving the most recent snapshot file 100 preceding the selected time and creating a first model (similar to the aforementioned "base" model) from that, applying all updates between that most recent snapshot file prior to the selected time and the selected time to create the second model (similar to the aforementioned "current" model, but actually corresponding to the selected time in the past), and then applying the contemplated updates to that second model to create the third model (corresponding to the aforementioned "test" model). Note that, in this scenario of generating reports for times in the past, there need be no time gap such as gap 104 because all of the updates that occurred between the immediately preceding BGP report 102 and the request time will be available. Particularly, in addition to reading all of the update reports 105 between the immediately preceding BGP report 102 and the request time and applying them to the base model, the system would also read the next update report immediately subsequent to the request time, but apply only the updates in that report that occurred prior to the request time.

As previously noted, the system provides various user interfaces for (a) inputting the contemplated network modifications, (b) the inputting of the source-destination node query, and (c) the generating of the various result reports. With regard to inputting the contemplated network modifications, in embodiments, the system allows a user to input the contemplated network reconfiguration event(s) in a simple, user-friendly manner, such as in the form of an intent model using declarative language.

Some common maintenance events include:
1. Change link cost to influence routing calculations to attract or divert traffic;
2. Add a new link to add redundancy or increase network throughput;
3. Gracefully shut-down a router to upgrade its software or hardware;
4. Add a new router to increase network bandwidth or add new services;
5. Add a new edge router with new peering capabilities or SLAs;
6. Decommission an edge router temporarily or permanently;
7. Change BGP route attributes, e.g.;
    a. To steer traffic to desired paths;
    b. To use alternate links when peering with upstream or downstream networks;
    c. To change preference of services, to influence reachability via certain peers In embodiments, the system may utilize a playbook framework to represent contemplated maintenance and capacity planning events. A playbook may comprise an ordered sequence of events. This may take the form of a declarative YAML (Yet Another Markup Language) file, featuring multiple recurring sections. FIG. 3 demonstrates an example playbook comprising five events.

In embodiments, the system further converts the user intent as expressed in a playbook into actionable network events that can be fed into the model/snapshot of the network. Each event in a playbook may be parsed in the backend to generate a sequence of network events. An example of such conversion for the example playbook of FIG. 3 is shown in FIG. 4.

With regard to entering a source-destination query, in embodiments, the DVR query framework disclosed in aforementioned U.S. patent application Ser. No. 18/434,963 may be extended to add DVR queries that, in addition to specifying a source node and a destination node, specify a certain playbook to be applied to a certain model to create the test model. A playbook can be applied to any DVR query, for example a L3vpn-pathtrace request. For instance, an optional parameter may be provided to apply a playbook of events to the network topology, such as:

show me the path from austin-tx-301 for customer green to 20.141.167.128 apply shutdown-routers where "austin-tx-301" is identity of the source node, "20.141.167.128" is the IP address of the destination node, and "shutdown-routers" is a playbook that defines a set of routers that are being gracefully shutdown for an upgrade cycle. In some embodiments, the query may also include a specific time at which the playbook is to be applied (e.g., the current time, as in the primary embodiments described above or a specific time in the past, as also discussed above).

The usefulness of the system is illustrated with the help of the network topology diagrams of FIGS. 1, 3, and 4. As previously discussed, FIG. 1 shows an exemplary network topology 10 showing every node in the network, nodes A through K, as well as the links between the nodes and the cost of each link. Let us consider an analyst source-destination query from node A to node K at a certain point in time for contemplated network changes comprising the first two steps in the exemplary playbook discussed above, namely;
Name: Change link cost
Router: E
Peer: F
Event: link-cost-update
Cost: 1500

Name: Graceful
shutdown router
Router: F
Event: graceful-shutdown

Let us consider FIG. 1 as showing the "before" picture of the network for this query. As seen, the path from Node A to node K as dictated by the RIB goes from node A to node D, then from node D to node E, then from node E to node F, and, finally, from node F to node K.

Figure 5:
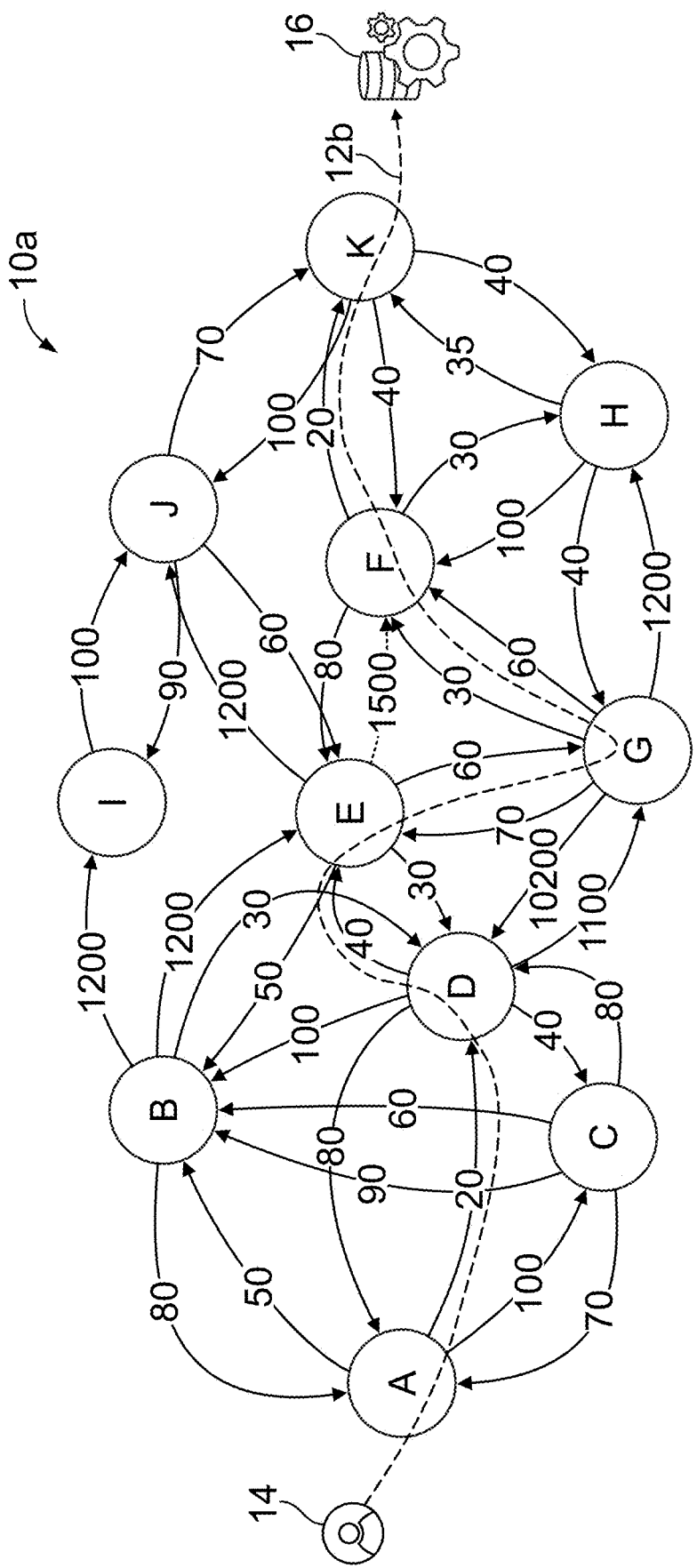
FIG. 5 is a diagram illustrating an exemplary network topology and packet routing through the network after a first contemplated network reconfiguration in accordance with embodiments.

FIG. 5 demonstrates the impact of the first step in the playbook, i.e., a link-cost change from E to F from '50' to '1500' units, which changes the network topology to topology 10a as shown in FIG. 5. As seen, the modified RIB dictates a new path from node A to node K comprising node A to node D, then from node D to node E, then from node E to node G, then from node G to node F, and, finally, from node F to node K. Thus, it is clear that there will still be a path between node A and node K after the cost change to the link between node E and node F.

Figure 6:
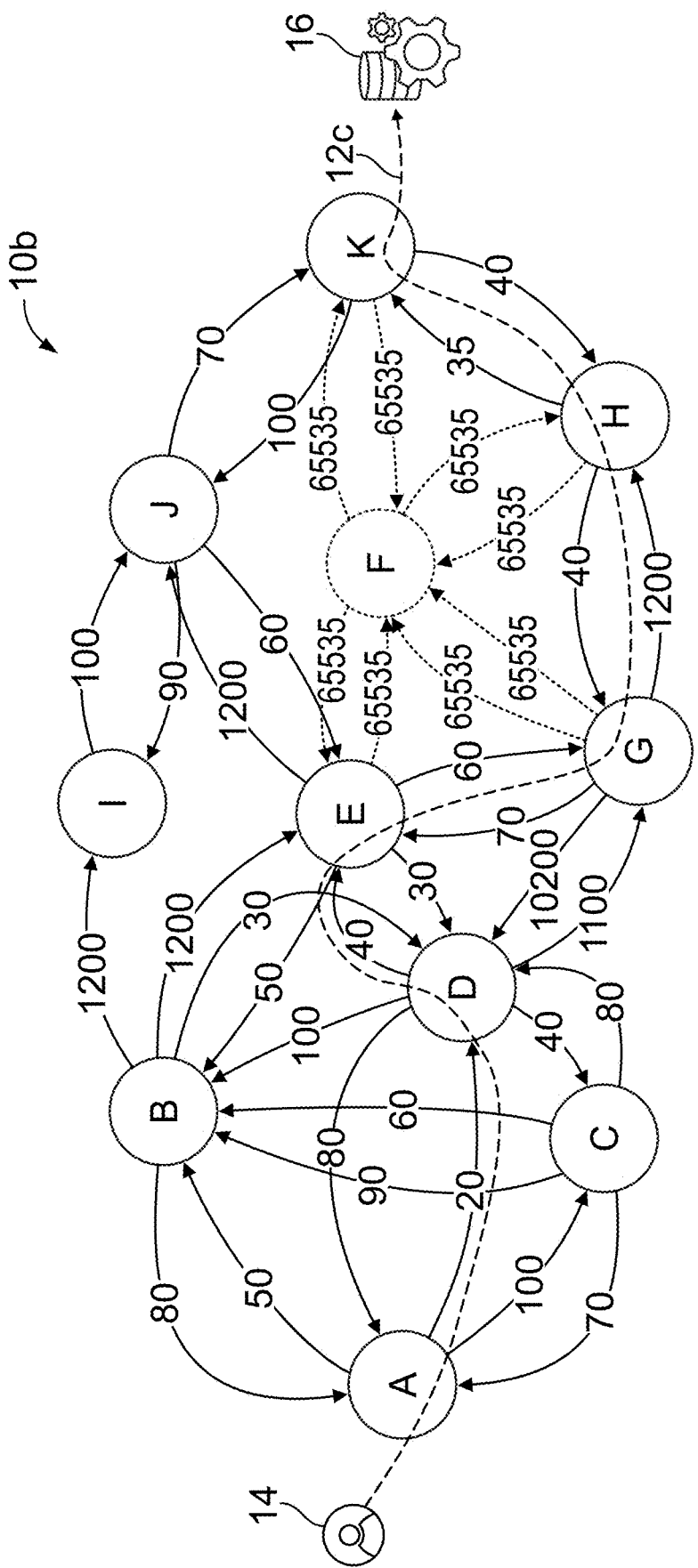
FIG. 6 is a diagram illustrating an exemplary network topology and packet routing through the network after a second contemplated network reconfiguration in accordance with embodiments.

FIG. 6 further demonstrates the additional impact of step 2 of the playbook, i.e., gracefully shutting down router F, which changes the network topology to topology 10b, as shown in FIG. 6. Particularly, this results in a change in the cost of all of node F's adjacencies to the MAX value of '65535', effectively costing out these links from any route calculations. The new path shows that the user can still reach the desired destination and how the traffic will traverse the next best path (i.e., node A to node D, node D to node E, node E to node G, node G to node H, and node H to node K).

Thus, based on these results, the analyst may determine that is it acceptable to shut down node F temporarily for maintenance without the need for any further changes to the network topology or cost structure. Alternately, the analyst may determine that, even though a path is available, the cost of the new path from node A to node K is greater than advisable, and that further changes to the network are desirable before shutting down Node F for maintenance, such as by adding another router, such as reflected in step 4 of the exemplary playbook.

With regard to the user interface for displaying the results to the user, in certain embodiments, after generating the results responsive to a query, the system may first provide the analyst a user interface showing an ordered lists of nodes representing the path that a packet would have taken through the network from the source node to the destination node under the contemplated network configuration.

In those cases where the test model indicates that there is more than one possible path that a packet may have taken, the system may show all possible paths that a packet could have taken. The system also may display information as to which type(s) of data would have taken each particular path.

If the system can determine a best path out of several potential paths as previously discussed, the report may also indicate the best path when there are multiple potential paths, such as by highlighting the most likely path in the list of potential paths or listing the potential paths in the order of likelihood. In an example, the determination of likelihood may be based on any criteria. For instance, if more than one best path is available via different peers, a BGP best path selection algorithm may be used to determine the best path and the system may present the best path along with the alternate paths, the tiebreaker, and BGP attributes. In another embodiment, if the particular path that would have been taken by a packet is a function of the type of data in the packet, then the potential paths may be listed in order as a function of the most commonly found data type in the network (or in networks in general) down to the least commonly found data type in the network (or networks in general).

In embodiments, the user interfaces are designed to be intuitive and user friendly. In one embodiment, the user interfaces are designed to cause the experience of using the system to at least partially mimic the use of a Digital Video Recorder (DVR), a device with which most people are familiar.

Aforementioned U.S. patent application Ser. No. 18/434, 963 includes FIGS. and descriptions of several user interfaces for presenting path traces data such as described hereinabove as well as the aforementioned drill-down data. Reference may be had to that patent application for examples of such interfaces. Those user interfaces can be readily modified (if any modifications are even necessary) to display the various path traces and drill down data discussed hereinabove.

For instance, different paths may be displayed in different rows of the display device. For each row, in addition to the ordered list of traversed nodes, additional columns may be provided showing additional relevant data. For instance, the display may include a column labelled "egress_PE", which contains the egress_PE of the destination node. The data displayed in this column may be configured as a clickable link that, when clicked on, will open another window containing more detailed information about the corresponding path (as discussed below). Another column may be labelled "prefix", which may be populated with the IP address (or prefix) of the destination node of the path. Yet another column may be populated with a hyperlink (represented by the word "Show" that, when clicked on, will generate a drop down menu revealing more detailed information about the corresponding path, namely, not only the network nodes in the path (which is already seen in the ordered list of nodes), but also the ingress port and the egress port of each such node that the data packet passed through. Yet a further column may show which peer node advertised this route.

Any number of additional columns of information may be provided for viewing. Any of the typical pieces of information that a network analyst attempting to triage a network fault might want to look at is available from the models/snapshots and can be displayed in this user interface (and/or in separate drill down user interfaces.

In one embodiment, clicking on any path trace in the initial user interface takes the user to a dynamically generated dashboard with several widgets displayed in separate panes of the window, each dedicated to a specific category or type of information about the corresponding path, and showing further details about the path, such as: (a) network status of upstream and downstream interfaces along the path; (b) syslogs, events and alarms from devices along the path; (c) IGP updates from the path elements and the entire network; and (d) prefix updates for the matching route prefix.

In one exemplary embodiment, clicking on the value in the "egress-pe" column of any path trace in the initial user interface opens up another user interface which presents the user with a plethora of relevant information about the corresponding path in a single window.

For instance, one widget/pane may be configured to show similar information as discussed above, but for the reverse path between the selected source and destination nodes. As previously noted, the forward data path between two nodes is not necessarily symmetric with the reverse data path between the two nodes.

Another widget/pane may graphically show the interface status of the path between the source and destination nodes, such as, for each node in the path, the node ID, the relevant ingress port of that node, the relevant egress port of that node, the IDs of the corresponding ports, and an indication of the status of the port (e.g., displaying the data in green meaning that the port was functioning properly and displaying the data in red meaning that the port was malfunctioning).

Yet another widget/pane may focus on information about packet loss. For instance, this widget may show the number of packets that were dropped at each port during the event time window.

Yet a further widget/pane may focus on log and alarm data. It may show a list of the logs and alarms that occurred along the path during the event time window. For each alarm/row, it may show relevant information, such as the time of the alarm, the program generating the alarm, the severity rating of the alarm, the priority of the alarm, etc.

Another widget/pane may show the path status time-line for the path.

The above-described interfaces as well as those disclosed in the aforementioned patent application Ser. No. 18/434, 963 are merely exemplary. In other embodiments, the various user interfaces may be arranged in different ways, may display additional or fewer items of information than shown in these examples, and/or may present the data in different graphical formats. The primary point is that virtually anything that a network analyst would want to know is available from the test model and can be made available for display upon request.

Figure 7:
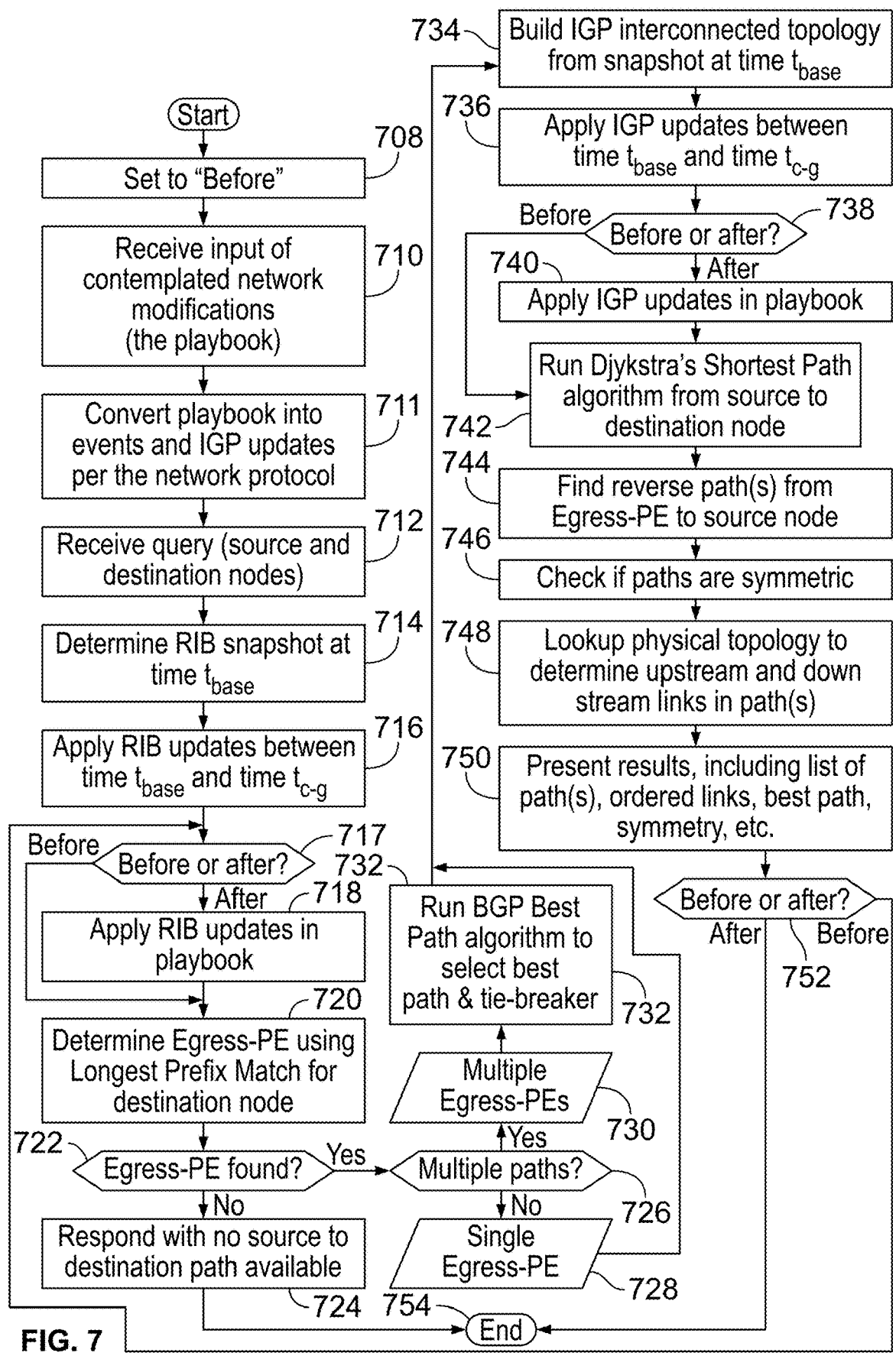
FIG. 7 is a flowchart illustrating operation of a process for forecasting the effect of contemplated network reconfigurations in accordance with embodiments.

FIG. 7 is a flowchart showing one exemplary process in response to a query as discussed hereinabove. This flowchart starts from the assumption that the relevant BGP file 102 and subsequent update files 105 have been previously stored and/or are available. Also, it illustrates an embodiment in which both "before" and "after" reports are generated.

The process begins at step 708 wherein a variable is set to "before" to indicate that the first report to be generated is the "before" report (i.e., showing the current state of the network before the contemplated modifications are implemented).

In step 710, the user inputs the contemplated network modification, e.g., in the form of a declarative language playbook.

In step 711, the system converts the actions described in the playbook into events in accordance with the language protocol of the network (e.g., IGP updates, etc.).

In step 712, the user inputs a query that identifies of the source and destination nodes of interest to the user.

In step 714, the system recreates the RIB at the time of the most recent BGP snapshot file preceding the current time, i.e., time $t_{base}$.

In step 716, the system checks the update files 105 to determine and apply all RIB updates that occurred between time $t_{base}$ and the time of the most recent update file, $t_{c-g}$.

In step 717, the system checks whether it is working on the "Before" model or the "After" model. If it is the "After" model, the process flows to step 718, where it applies the RIB updates in the playbook. If it is the "Before" model, flow skips step 718.

Next, in step 720, the system attempts to determine an egress-PE for the destination node, e.g., using a longest prefix match.

In step 722, the system checks whether an egress-PE was found. If not, flow proceeds to step 724, where the system returns a message (user interface) indicating that it found no route between the source node and the destination node. For such a case, no further processing is necessary and the process ends at step 754.

If, on the other hand, at least one route is determined, the process instead continues to step 726. In step 726, the system determines whether there is more than one potential path. If so, flow proceeds to step 730, in which the system returns multiple egress-PEs for further processing. Specifically, flow proceeds from step 730 to step 732, wherein the system runs a BGP Best Path Algorithm to select one of the multiple potential paths to indicate as the best path. The system also determines what factor was the tie breaker that caused the selected best path to be selected as such.

If, on the other hand, it is determined in step 726 that there is only one path, flow instead proceeds to step 728, in which the system returns the one egress-PE for further processing.

In either event, flow then proceeds from either step 732 or step 728 to step 734, wherein the system builds an IGP interconnected topology at time $t_{base}$ based on the most recent snapshot file.

Next, in step 736, the system applies all updates reflected in the update files between time $t_{base}$ and time $t_{c-g}$ to create a new topology. This is the "Before" topology.

Next, in step 738, the system again checks if it is working on the "Before" model or the "After" model. When it is working on the "After" model, flow proceeds from step 738 to step 740, where the system additionally applies all of the updates from the playbook to build yet another topology, this one being the test or "After" topology.

From either step 738 or step 740, flow proceeds to step 742, where the system runs a Dijkstra's Shortest Path Algorithm from the ingress node/device to the egress-PE(s) to determine the path that a data packet would have taken from ingress/source to egress/destination in the network. If there were multiple egress-PEs, it will determine all potential paths and note which one was determined to be the best path.

Next, in step 744, the system determines the corresponding reverse path(s) from the egress-PE(s) to the ingress device/node.

Next, in step 746, the system determines whether the forward and reverse paths are symmetrical.

Next, in step 748, the system looks up the physical topology to determine the upstream and downstream links in the paths (e.g., the specific ports of the nodes that the data entered and exited the node).

Next, at step 750, the system generates a response to the query (either the "Before" or "After" response at the case may be). The response may include a list of the relevant paths, links, best path (if applicable), and forward/reverse symmetry determination and other information such as shown in FIGS. 4-9 during the event time window between T1 and T2.

Next, in step 752, if the system was working on the "Before" model, the process flows back to step 717 to re-run the process for the "After" model with the additional steps (e.g., 718 and 740) as already described hereinabove. If it was working on the "After" model, the process ends at step 754.

The process reflected in the flowchart of FIG. 7 is merely exemplary and, in particular, includes several features that may be omitted, such as finding reverse paths or generating the "Before" model. On the other hand, it does not include some of the features discussed elsewhere in this disclosure, such as performing the evolution from the base model to the test model in a single step without distinctly generating the intermediate $t_{c-g}$ model.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs).

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), quantum computer, and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

The invention claimed is:

1. A computer-readable device comprising non-transitory instructions, which, when executed by a processor, cause the processor to perform operations, the operations comprising:
   receiving information defining at least one proposed modification to a configuration of a communication network;
   receiving a query identifying a source device in the communication network and a destination device in the communication network;
   accessing a first snapshot of a state of the communication network at a first time, the first snapshot comprising a topology of the communication network and a Routing Information Base (RIB) of the communication network at the first time;
   accessing a set of network updates, the set of network updates comprising all updates to the topology and RIB of the communication network that occurred between the first time and a second time;
   generating, based on the first snapshot of the communication network and the set of updates, a second snapshot of the communication network, the second snapshot comprising a RIB and a topology of the communication network at the second time;
   generating, based on the generated RIB and a topology of the communication network at the time of the most recent accessed network update and the proposed at least one modification, a third snapshot of the communication network, the third snapshot comprising a RIB and a topology of the communication network as it would be if reconfigured in accordance with the proposed at least one modification; and
   determining, based on the RIB and topology of the third snapshot, at least one path through the communication network that a data packet intended for transmission from the source device to the destination device could traverse through the proposed modified communication network.

2. The computer-readable device of claim 1 wherein the second time is a time of a most recent network update report preceding a current time.

3. The computer-readable device of claim 1 wherein the operations further comprise:
   generating a first report indicating the at least one path through the proposed modified communication network, the report comprising at least an ordered list of the network nodes in the at least one path through the proposed modified communication network.

4. The computer-readable device of claim 3 further comprising the operation of, if more than one path was possible, executing a BGP best path algorithm to determine which of the more than one paths was a best path and wherein the operation of generating the report further comprises an indication of which of the more than one paths was the best path.

5. The computer-readable device of claim 4 wherein the operations further comprise: determining, based on the generated RIB and topology of the third snapshot, at least one path through the communication network that a data packet intended for transmission from the destination device to the source device would traverse.

6. The computer-readable device of claim 1 wherein the operations further comprise:
   determining, based on the RIB and topology of the third snapshot, at least one reverse path through the communication network that a data packet intended for transmission from the destination device to the source device could traverse through the proposed modified communication network; and
   generating a second report indicating the at least one reverse path, the report comprising at least an ordered list of the network nodes in the at least one path through the communication network at the time of the most recent accessed update.

7. The computer-readable device of claim 1 further comprising:
   storing snapshots of the state of the network at intervals of a first duration; and
   storing, at second intervals smaller than the first intervals, update reports, wherein each update report comprises updates to the network that occurred between a time of the immediately preceding snapshot or the immediately preceding update report and the current update report; and
   wherein the second time is before a most recent stored snapshot of the state of the network.

8. The computer-readable device of claim 7 wherein the first interval is between 6 and 24 hours and the second interval is between 5 and 30 minutes.

9. The computer-readable device of claim 7 wherein the first interval is 12 hours and the second interval is 10 minutes.

10. A computer-readable device comprising non-transitory instructions, which, when executed by a processor, cause the processor to perform operations, the operations comprising:
    receiving information defining at least one proposed modification to a current configuration of a communication network;
    receiving a query identifying a source device in the communication network and a destination device in the communication network;
    accessing a first snapshot of a state of the communication network at a first time, the snapshot comprising a topology of the communication network and a Routing Information Base (RIB) of the communication network at a time preceding the time of interest;
    accessing a set of network updates, the set of network updates comprising all updates to the topology and RIB of the communication network that occurred between the first time and a current time;

generating, based on the first snapshot of the communication network, the set of updates, and the proposed at least one modification, a second snapshot of the communication network, the second snapshot comprising a RIB and a topology of the communication network reconfigured in accordance with the proposed at least one modification; and determining, based on the RIB and topology of the second snapshot, at least one path through the communication network that a data packet intended for transmission from the source device to the destination device could traverse.

11. The computer-readable device of claim 10 wherein the operations further comprise:

generating a first report indicating the at least one path through the proposed modified communication network, the report comprising at least an ordered list of the network nodes in the at least one path through the proposed modified communication network.

12. The computer-readable device of claim 11 further comprising the operation of, if more than one path was possible, executing a BGP best path algorithm to determine which of the more than one paths was a best path and wherein the operation of generating the report further comprises an indication of which of the more than one paths was the best path.

13. The computer-readable device of claim 12 wherein the operations further comprise:

determining, based on the generated RIB and topology of the second snapshot, at least one path through the communication network that a data packet intended for transmission from the destination device to the source device would traverse.

14. The computer-readable device of claim 10 further comprising:

storing snapshots of the state of the network at intervals of a first duration;

storing, at second intervals smaller than the first intervals, update reports, wherein each update report comprises updates that occurred between a time of the immediately preceding snapshot or the immediately preceding update report and the current update report; and wherein the time of interest is before a most recent stored snapshot of the state of the network.

15. A method of determining a path that a data packet would traverse through a communication network if at least one proposed modification were made to a configuration of the communication network, the method comprising:

receiving information defining at least one proposed modification to a configuration of a communication network;

receiving a query identifying a source device in the communication network and a destination device in the communication network;

accessing a first snapshot of a state of the communication network at a first time, the first snapshot comprising a topology of the communication network and a Routing Information Base (RIB) of the communication network at the first time;

accessing a set of network updates, the set of network updates comprising all updates to the topology and RIB of the communication network that occurred between the first time and a second time;

generating, based on the first snapshot of the communication network and the set of updates, a second snapshot of the communication network, the second snapshot comprising a RIB and a topology of the communication network at the second time;

generating, based on the generated RIB and a topology of the communication network at the second time and the proposed at least one modification, a third snapshot of the communication network, the third snapshot comprising a RIB and a topology of the communication network as it would be if reconfigured in accordance with the proposed at least one modification; and determining, based on the RIB and topology of the third snapshot, at least one path through the communication network that a data packet intended for transmission from the source device to the destination device could traverse through the proposed modified communication network.

16. The method of claim 15 wherein the second time is a time of a most recent network update report preceding a current time.

17. The method of claim 15 wherein the operations further comprise:

generating a first report indicating the at least one path through the proposed modified communication network, the report comprising at least an ordered list of the network nodes in the at least one path through the proposed modified communication network.

18. The method of claim 17 further comprising the operation of, if more than one path was possible, executing a BGP best path algorithm to determine which of the more than one paths was a best path and wherein the operation of generating the report further comprises an indication of which of the more than one paths was the best path.

19. The method of claim 15 further comprising:

storing snapshots of the state of the network at intervals of a first duration;

storing, at second intervals smaller than the first intervals, update reports, wherein each update report comprises updates to the network that occurred between a time of the immediately preceding snapshot or the immediately preceding update report and the current update report; and wherein the second time is before a most recent stored snapshot of the state of the network.

\* \* \* \* \*